US006057015A

United States Patent [19]

Blum et al.

[11] Patent Number: 6,057,015

[45] Date of Patent: May 2, 2000

[54] CONTAINERS AND METHODS FOR WASTE RECYCLING

[75] Inventors: Melvin Blum, Wantagh, N.Y.; Michael Roitberg, Highland Park, N.J.

[73] Assignee: Burlington Bio-Medical and Scientific Corporation, Farmingdale, N.Y.

[21] Appl. No.: 08/921,588

[22] Filed: Sep. 2, 1997

[51] Int. Cl.[7] ..................... A01N 25/34; B02C 19/12

[52] U.S. Cl. ..................... 428/35.7; 424/412; 424/413; 424/438; 426/138; 426/234; 426/237; 426/240; 426/635; 264/918; 241/3

[58] Field of Search ..................... 428/35.7; 424/405, 424/409, 410, 411, 412, 413, 438; 426/138.2, 807, 615, 635, 234, 237, 240; 264/918; 241/3

[56] References Cited

U.S. PATENT DOCUMENTS

| | | | |
|---|---|---|---|
| 3,186,869 | 6/1965 | Friedman | 428/335 |
| 3,209,977 | 10/1965 | Lewis et al. | 383/1 |
| 3,279,511 | 10/1966 | Griffin, Jr. | 383/1 |
| 3,454,510 | 7/1969 | Newland et al. | 523/126 |
| 3,632,039 | 1/1972 | Gayle | 206/525 |
| 3,762,454 | 10/1973 | Wilkins, Jr. | 383/1 |
| 3,957,908 | 5/1976 | Heslinga et al. | 524/308 |
| 4,121,025 | 10/1978 | Scott | 523/125 |
| 4,342,830 | 8/1982 | Holloway | 435/161 |
| 4,984,561 | 1/1991 | Warrington | 435/290.1 |
| 4,997,469 | 3/1991 | Moore | 71/11 |
| 5,073,401 | 12/1991 | Mohr | 426/658 |
| 5,111,933 | 5/1992 | Di Biasi et al. | 206/223 |
| 5,198,252 | 3/1993 | Simsa et al. | 426/53 |
| 5,223,231 | 6/1993 | Drake | 422/297 |
| 5,524,423 | 6/1996 | Haley | 56/1 |

FOREIGN PATENT DOCUMENTS

| | | |
|---|---|---|
| 798819 | 5/1966 | Canada . |
| 1586344 | 3/1981 | United Kingdom . |

*Primary Examiner*—Rena L. Dye
*Attorney, Agent, or Firm*—Oliff & Berridge, PLC

[57] ABSTRACT

Polymeric or cellulosic water and/or heat degradable containers are filled with organic waste, primarily refuse foodstuffs. The containers are dissolved or melted, spilling the waste for sterilization and subsequent processing into animal feed. The containers include, or have added thereto during or after manufacturing, biocides, antioxidants, preservatives and/or antibiotics.

49 Claims, No Drawings

CONTAINERS AND METHODS FOR WASTE RECYCLING

BACKGROUND OF THE INVENTION

1. Field of Invention

The invention is directed to water and/or heat degradable containers for storage of waste material, particularly organic waste, while retarding oxidation and microbial activity, and methods of recycling the waste material into useable substances, such as animal feed.

2. Description of Related Art

Many large institutions, as well as individuals, produce waste that can be recycled into usable products. Methods currently exist for recycling plastics, glass and paper waste material. However, few worthwhile methods of recycling organic waste on a large scale, other than composting, currently exist. Ideally, organic waste materials, comprising mostly foodstuffs, could be recycled into animal feed using water or heat degradable containers for transportation and storage.

Water or heat degradable containers for use in composting or handling of hazardous waste materials are known. In these cases, the container is meant to degrade upon timed exposure to one or more of light, air, water and heat, or to break open, melt or dissolve upon contact with water, exposure to heat, or a combination thereof.

For example, in the medical industry, it is vital that clothing and bedding contaminated with bodily fluids or excrement be collected and washed without further spreading any bacteria, protozoa or viruses. Therefore, bags that have a hot or cold water-soluble seam, and that additionally may themselves be hot water soluble, are used to contain soiled or contaminated materials. The bags are placed directly in a washing machine where the first rush of water begins dissolving the seam, thereby opening the bag to clean the materials. See U.S. Pat. Nos. 3,632,039, 3,279,511 and 3,209,977. Additionally, the caustic materials used to clean the laundry may be sealed in a water soluble container, or a container with a water soluble seam, as demonstrated in U.S. Pat. No. 3,186,869. In this manner, the user need not handle the caustic chemicals.

Another means of handling medical waste is to place it in a fully degradable container, such as that described in U.S. Pat. No. 5,223,231. The container is filled with hazardous waste, saturated by steam, irradiated and autoclaved. The resulting material is dried, granulated and disposed of by dumping.

Fully degradable materials for use in composting are also known. A bio-degradable fabric net for leaf storage and decomposition is described in U.S. Pat. No. 5,524,423. A bag that degrades on exposure to oxygen is disclosed in U.S. Pat. No. 5,111,933. This bag contains antioxidants as stabilizers, but the antioxidants are volatile at decomposition temperatures. Further, traditional composting devices, such as those that allow moisture and air to enter from the bottom, and light to enter from the top, are also known. Generally, these containers are made of solid materials, such as metal, plastic and fiberglass. U.S. Pat. No. 4,984,561.

A water degradable garbage bag is disclosed in U.S. Pat. No. 3,762,454 for use in landfills or sea disposal of waste. This bag may include a disinfectant or bactericide to prevent further bacterial action, or digesting bacteria to aid in environmentally friendly decomposition.

In addition, packaging materials can be made of water soluble resins to reduce environmental waste, as disclosed in U.S. Pat. No. 3,957,908. Natural by-products of agriculture can be formed into nitrogenous capsules for use as fertilizers or other soil improving agents, as disclosed in U.S. Pat. Nos. 4,997,469 and 5,198,252. Alternatively, bio-degradable sheet seed structures can be formed for use in hydroponics, as disclosed in U.S. Pat. No. 5,073,401.

Plant waste can also be made into animal fodder. For producing animal fodder, the waste material is mixed with cellulosic materials and materials that precipitate biological degradation, such as certain enzymes and nonpathogenic bacteria. U.S Pat. No. 5,198,252. The waste material may be collected in a perforated container that is subjected to steam sterilization before treatment with a microorganism to form an ethanol mash that is made into feed supplements. U.S. Pat. No. 4,342,830.

All of the above methods either facilitate recycling of waste, or ease handling of hazardous materials. However, these methods of waste disposal generally are slow (composting), costly and/or do not eradicate the problems of landfill or removal to barges for disposal at sea. Further, in this instance, incineration is not cost effective. The resulting ash from incineration has limited applications and must still be removed because ash is not biodegradable.

The object of this invention is to create an easy and efficient means of recycling organic waste into useful animal feed. In particular, no special care of the waste should be required by the waste generator.

SUMMARY OF THE INVENTION

The present invention is directed to a water and/or heat soluble polymeric or cellulosic container that can withstand normal filling with and transportation of waste material without degradation. This container can then be degraded as part of a sterilization step in the process of recycling the waste material into animal feed additives. In this manner, the container of the present invention is easy to use because, from the waste-generator's point of view, it may be filled and placed with other containers for normal garbage pickup. Further, once the waste is recycled into animal feed, little or no residue remains, eliminating numerous disposal problems.

DETAILED DESCRIPTION OF PREFERRED EMBODIMENTS

According to the present invention, large institutions, such as schools, prisons, hotels, hospitals, military installations, restaurants, schools and universities, for example, as well as individuals, can compile their waste in a water soluble and/or temperature degrading heavy duty polymeric or cellulosic waste container.

The recyclable waste of the present invention mainly includes, but is not limited to, organic refuse such as vegetables, fruits, meats, poultry, fish, paper, grains, solid fats, dairy products, confectionery sugars, starches, bakery products, and the like. These materials can be segregated for recycling by first eliminating glass, metal, ceramics, unprocessable polymers, and other like non-organic materials. Because many communities already segregate and recycle these items separately, this should not pose a large burden. Alternatively, any non-organic materials can be shredded and removed as an aftermath if they are accidentally included with the organic waste material.

In embodiments, the waste container includes, but is not limited to, a polyvinyl alcohol (PVA) or methyl hydroxypropylcellulose container, with a standard capacity of about 39 to 45 gallons. However, any suitable size container may be used. These containers can be specifically designed and marked for use in recycling waste into animal feed additives. For example, the containers can be clearly identified by a color, such as red or yellow, to differentiate them from the current black, brown and dark green garbage bags. Additionally, the containers can be printed with the intended use.

The containers containing the waste material are taken to a processing center and placed in heated vats of water or in autoclave environments where the containers dissolve or melt at a specific temperature. The contents are then further treat a rendering or ruminant processing plant by shredding, grinding, hydrolyzing, and other means to form Food and Drug Administration (FDA) approved feed additives. In this manner, a large percentage of the organic waste materials can be practically used, rather than being incinerated or buried, saving both costs and landfill space.

In embodiments, the containers into which the organic waste is placed can be impregnated or interiorally coated with, or have added thereto, active ingredients such as antioxidants, biocides, and/or preservatives to help prevent spoilage. Further, antibiotics may also be added to the containers.

In embodiments, these active ingredients may be added directly to the waste in the form of a spray or in the form of pellets before or after addition to the container. Alternatively, it is possible to saturate a cellulose type cloth or other material with a combination of active ingredients such as biocides, antioxidants, preservatives and the like. This cloth may then be added to each container with the waste, allowing the active ingredients to slowly migrate from the cloth into the waste.

In embodiments, biocides, preferably bactericides or antimicrobials, may be added to the container material during manufacture, coated on the inside of the container after manufacture, or directly added to the waste. Acceptable biocides include, but are not limited to, one or more of triclosan, benzalkonium and salts thereof, benzethonium and salts thereof, polyvinylpyrrolidone (PVP) iodine, chlorothymol, nonoxynols, chlorhexidine salts, glutaraldehyde, isothiazolones, cresols, phenols, hexachlorophene, and like substances. The amount of each biocide is from about 10 ppm to about 10,000 ppm of a composition, although amounts outside this range may be used.

One or more antioxidants may also be added to the container material during manufacture, coated on the inside of the container after manufacture, or added directly to the waste, thereby preventing peroxidation and subsequent rancidity of fatty waste material. In embodiments, the amount of each antioxidant is from about 5 ppm to about 5,000 ppm of a composition, although amounts outside this range can be used. Antioxidants include, but are not limited to, one or more of butylated hydroxyanisole (BHA), butylated hydroxytoluene (BHT), tertiary butyl hydroquinone (TBHQ), ethoxyquin and salts thereof, dilauryl thiodipropionate (DLTDP), n-propyl gallate, tocopherols, tocotrienols, hydroquinone and esters thereof, gallic acid salts and esters thereof, gamma oryzanol, ascorbic acid and ascorbates, ascorbyl palmitate and dipalmitate, like substances, and combinations thereof.

Preservatives may also be added during or after manufacture of the container material to prevent or retard spoilage of the organic waste material. In embodiments, preservatives include, but are not limited to, one or more of propionates, erythorbates, nitrites, parabens, benzoates, sorbates, sulfites, bisulfites, thiopropionates, chloramine T, thiazolones, hydantoin, imidurea and the like. The amount of each preservative is from about 10 ppm to about 10,000 ppm of a composition, although amounts outside this range can be used.

Further, freeze dried bacteria, such as bacillus subtillus, yeast, rhizobium, and lactobacillus, or enzymes for digesting the garbage, such as cellulase, papain, ficin, bromelain, lipase, pepsin, protease amylase, collagenase, lysozyme, trypsin and the like, may be added directly to the garbage in any effective amount. Antibiotics, such as penicillins, tetracyclines, bacitracin, gentamycin, polymixin, gramicidin, neomycin, erythromycin and the like may also be added in any effective amount.

Other additives such as fillers, dyes, pigments, perfumes, lubricants, slip agents, blooming agents and stabilizers may be added to the polymeric or cellulosic container material as needed to impart different properties to the containers. The effective amount of such additives can be determined by one of ordinary skill in the art.

The containers of the present invention are made of water and/or heat degradable polymeric or cellulosic materials. In preferred embodiments, polyvinyl alcohol (PVA), polyvinyl chloride (PVC), a combination thereof, or methyl hydroxypropylcellulose are used. However, any cellulosic or polymeric material that is water or heat degradable may be used. In preferred embodiments, the cellulosic or polymeric material dissolves in water at an elevated temperature range of from about 140–160° F.

In embodiments, one or more of these cellulosic or polymeric materials may be mixed in a blender, such as a water cooled ribbon blender, and maintained at a temperature of about 50–70° F. while grinding and blending. Preferably, the bactericides, preservatives, antioxidants and/or antibiotics are homogeneously incorporated into the polymeric or cellulosic material during blending. If the temperature during grinding and blending is above 70° F., the mixture may burn and the polymer, copolymers or cellulosic material with the additives may blacken, making the mixture unusable. However, temperatures outside the range may be used as appropriate.

To reduce friction during blending, a stearate lubricant including, but not limited to, calcium, aluminum, zinc, magnesium, and the like, may be added in an amount of from about 0.1% to about 1.0% by weight of the container material.

Once the polymeric or cellulosic material is blended, the mixture is fed from a feed zone into a die zone from which it is extruded. Preferably, the die zone produces 1/16" to 1/4" spaghetti- or ribbon-like straws. The operational temperature for the feed zone is preferably from about 70° F. to about 270° F., while the operational temperature for the die zone is preferably from about 225° F. to about 325° F. The ribbons or straws that are extruded from the die zone are cut into lengths by means known in the art, such as a breaker plate, knife or propeller, for example. The lengths are dropped or fall into water of about 50–75° F., thereby causing the pieces to form and maintain a pellet like shape and form.

The advantage to forming pellets of the container material is the low degree of toxicity and ease of handling. The pellets encapsulate any toxic substances in a homogenized solid or pelletized form. Therefore, if this material is accidentally ingested, it will pass through a body without being absorbed. Further, the pellets are unlikely to create or cause dust, which might cause irritation if it comes into contact with the skin, eyes or mucus membranes.

Once formed, the pellets are incorporated directly into the final product, the waste container, preferably a bag, at any convenient stage of the manufacturing process. Preferably, the pellets are added to a melt of a polymeric or cellulosic material before calendering. The containers are then formed from the polymeric melt after calendering by any process known to one of ordinary skill in the art, such as rolling.

In alternative embodiments, active ingredients such as the biocides, preservatives, antioxidants and antibiotics may be added in a solvent or carrier to the molten or liquefied polymeric or cellulosic material prior to calendering. The active ingredients are dissolved in an appropriate solvent including, but not limited to, an alcohol such as methanol, isopropyl alcohol, isodecyl alcohol or benzyl alcohol; a glycol such as propylene glycol or ethylene glycol; glycerin or a glycerol; dimethyl sulfoxide; a plasticizer such as epoxidized soy oil (ESO), diisodecyl phthalate (DIDP), dinonyl phthalate (DNP), dioctyl phthalate (DOP), or polypropylene glycol (PPG); alkyl hexane diols or other diols; combinations thereof, or other suitable substances.

Optionally, the inner lining of the containers can be coated with the active ingredients, mixed with a gum blend, adhesive or resin, after manufacture. The active ingredients may also be added directly to the waste in the form of pellets, a spray, or an impregnated material.

By any of these methods, the biocides, antioxidants, preservatives and/or antibiotics are added to the waste container. The container should be of sufficient thickness to support the weight of the waste to be contained therein. If the container is a bag, heavier gauge bags can sustain more weight. In embodiments, the thickness is from about 1 to about 10 mils for bags ranging in size from about 30 to about 100 gallons. The bag should have good tensile strength, elongation and tear resistance characteristics. Cellulose type bags (methyl, hydroxypropyl, carboxy methyl cellulose, and the like) are less desirable than polymeric type bags because they do not possess the strength of the polymeric type bags. However, extra durability may be provided to cellulose type bags by the addition of styrenes. Unfortunately, styrene additives usually are not water soluble and have to be skimmed off during the process of recycling the waste into animal feed additives.

In embodiments, once filled with waste, the containers are 1) dumped into vats of hot water at a temperature of about 180° to about 220° F., although other temperatures may be used; 2) placed in an autoclave environment; or 3) melted by infrared or microwave irradiation. In this manner, the containers are dissolved or melted, and the contents of the containers are sterilized before further processing (e.g., shredding, grinding, hydrolyzing, etc.) for conversion into an acceptable animal feed under FDA guidelines.

The containers of the present invention may not completely dissolve in the rendering bath of heated water, leaving a residue like a skim on the surface of the bath. However, this residue is easily removed during the processing of the waste material into animal feed additives.

Other types or designs of containers besides fully water soluble containers may be used. For example, containers where only the seam is water and/or temperature sensitive, can be used. However, these containers are less desirable than containers which completely degrade because they ultimately require separation from the organic waste before processing into animal feed.

The following Examples illustrate specific embodiments of the invention. These Examples are intended to be illustrative only, and the invention is not limited to the materials, conditions or process parameters set forth in the Examples. All parts and percentages are by weight unless otherwise indicated. All patents and publications cited in this application are incorporated herein by reference in their entirety.

EXAMPLES

Example 1

A composition for addition to a waste container, such as a bag, and/or organic material may be formulated as follows:

| | |
|---|---|
| Benzalkonium chloride | 0.1% |
| (or Triclosan | .0025%) |
| Ethoxyquin phosphate | 0.01% |
| Ethanol | 10% |
| Propylene glycol | 10% |
| Water | Balance |

The composition may be used to coat or spray the inside of a polymeric or cellulosic bag, or may be applied directly to the organic waste before or after it is placed in the bag. Further, the composition, with water in an amount from 0–5%, may also be used to impregnate a material, such as a cloth. The impregnated cloth is then added to the bag or directly to the organic waste.

Example 2

A composition for incorporation into a polymeric or cellulosic waste container, such as a bag, may be formulated as follows:

| | |
|---|---|
| Ethoxyquin | 1–5% |
| Propylene glycol | 10–20% |
| Triclosan | 0.1–0.2% |
| Epoxydized soy oil | Balance |

The composition is added to a polymeric or cellulosic material. The composition and material are blended and extruded through a die zone to form spaghetti-like straws. The straws are cut into lengths and dropped into water, forming pellets. These pellets are added to a melt of polymeric or cellulosic material at any convenient stage of manufacturing a bag according to conventional processes known in the art. Preferably, the pellets are added before calendering. After calendering, the bag is formed by any process known to one of ordinary skill in the art, such as rolling.

Other embodiments and variations will be obvious to one of ordinary skill in the art, and are intended to be covered by this disclosure.

What is claimed is:

1. A container for recycling organic waste into animal feed comprising:

a material selected from a polymer and a cellulose;

an antioxidant;

a biocide; and at least one of a preservative and an antibiotic.

2. The container of claim 1, wherein said material is water-soluble.

3. The container of claim 2, wherein the material is water soluble at a temperature of from about 140–160° F.

4. The container of claim 1, wherein the polymer is polyvinyl alcohol, polyvinyl chloride or a combination thereof.

5. The container of claim 1, wherein the cellulose is methyl hydroxypropylcellulose.

6. The container of claim 1, wherein the antioxidant is in an amount of from about 5 to about 5,000 ppm of the container.

7. The container of claim 1, wherein the biocide is in an amount of from about 10 to about 10,000 ppm of the container.

8. The container of claim 1, wherein:

the antioxidant is selected from the group consisting of butylated hydroxyanisole, butylated hydroxytoluene, tertiary butyl hydroquinone, ethoxyquin and salts thereof, dilauryl thiodipropionate, n-propyl gallate, tocopherols, tocotrienols, hydroquinone and esters thereof, gallic acid salts and esters thereof, gamma oryzanol, ascorbic acid and ascorbates, ascorbyl palmitate, dipalmitate, and mixtures thereof; and the biocide is selected from the group consisting of triclosan, benzalkonium and salts thereof, benzethonium and salts thereof, polyvinylpyrrolidone iodine, chlorothymol, nonoxynols, chlorhexidine salts, glutaraldehyde, isothiazolones, cresols, phenols, hexachlorophene and mixtures thereof.

9. The container of claim 8, wherein the antioxidant is ethoxyquin.

10. The container of claim 8, wherein the biocide is triclosan.

11. The container of claim 1, wherein the preservative is selected from the group consisting of propionates, erythorbates, nitrites, parabens, benzoates, sorbates, sulfites, thiopropionates and mixtures thereof.

12. The container of claim 11, wherein the preservative is thiopropionate.

13. The container of claim 1, wherein the antibiotic is selected from the group consisting of tetracycline, oxytetracycline, chlortetracycline and mixtures thereof.

14. A method of recycling organic waste into animal feed, comprising the steps of:

forming a container, wherein said container comprises cellulosic or polymeric material, an antioxidant, a biocide, and at least one of a preservative and an antibiotic;

filling said container with organic waste;

degrading said waste-filled container to release said organic waste; and processing said organic waste into animal feed.

15. The method of claim 14, wherein said material is water-soluble.

16. The method of claim 15, wherein said material is water-soluble at a temperature of from about 140–160° F.

17. The method of claim 14, further comprising the step of adding a composition containing an active ingredient to said container, wherein said active ingredient is selected from the group consisting of a biocide, an antioxidant, a preservative, an antibiotic, and a combination thereof.

18. The method of claim 17, wherein said step of adding comprises applying said composition to an interior surface of said container by a process selected from the group consisting of coating, spraying, or a combination thereof.

19. The method of claim 14, further comprising the step of adding a composition containing an active ingredient to said organic waste, wherein said active ingredient is selected from the group consisting of a biocide, an antioxidant, a preservative, an antibiotic, and a combination thereof.

20. The method of claim 19, wherein said composition is added to said organic waste as a spray, a pellet, an impregnated material, or a combination thereof.

21. The method of claim 14, wherein the step of degrading is selected from the group consisting of placing the waste-filled container in water at a temperature of at least 140° F.; placing the waste-filled container in an autoclave environment; irradiating said waste-filled container with microwave or infrared radiation; and a combination thereof.

22. The method of claim 14, wherein the polymeric material is polyvinyl alcohol, polyvinyl chloride or a combination thereof, and the cellulosic material is methyl hydroxypropylcellulose.

23. The method of claim 14, wherein the antioxidant is in an amount of from about 5 to about 5,000 ppm of the container.

24. The method of claim 14, wherein the antioxidant is selected from the group consisting of butylated hydroxyanisole, butylated hydroxytoluene, tertiary butyl hydroquinone, ethoxyquin and salts thereof, dilauryl thiodipropionate, n-propyl gallate, tocopherols, tocotrienols, hydroquinone and esters thereof, gallic acid salts and esters thereof, gamma oryzanol, ascorbic acid and ascorbates, ascorbyl palmitate, dipalmitate, and mixtures thereof.

25. The method of claim 24, wherein the antioxidant is ethoxyquin.

26. The method of claim 14, wherein the biocide is in an amount of from about 10 to about 10,000 ppm of the container.

27. The method of claim 14, wherein the biocide is selected from the group consisting of triclosan, benzalkonium and salts thereof, benzethonium and salts thereof, polyvinylpyrrolidone iodine, chlorothymol, nonoxynols, chlorhexidine salts, glutaraldehyde, isothiazolones, cresols, phenols, hexachlorophene and mixtures thereof.

28. The method of claim 27, wherein the biocide is triclosan.

29. The method of claim 14, wherein the preservative is selected from the group consisting of propionates, erythorbates, nitrites, parabens, benzoates, sorbates, sulfites, thiopropionates and mixtures thereof.

30. The method of claim 29, wherein the preservative is thiopropionate.

31. The method of claim 14, wherein the antibiotic is selected from the group consisting of tetracycline, oxytetracycline, chlortetracycline and mixtures thereof.

32. The method of claim 17, wherein the antioxidant is in an amount of from about 5 to about 5,000 ppm of the composition.

33. The method of claim 17, wherein the antioxidant is selected from the group consisting of butylated hydroxyanisole, butylated hydroxytoluene, tertiary butyl hydroquinone, ethoxyquin and salts thereof, dilauryl thiodipropionate, n-propyl gallate, tocopherols, tocotrienols, hydroquinone and esters thereof, gallic acid salts and esters thereof, gamma oryzanol, ascorbic acid and ascorbates, ascorbyl palmitate, dipalmitate, and mixtures thereof.

34. The method of claim 33, wherein the antioxidant is ethoxyquin.

35. The method of claim 17, wherein the biocide is in an amount of from about 10 to about 10,000 ppm of the composition.

36. The method of claim 17, wherein the biocide is selected from the group consisting of triclosan, benzalkonium and salts thereof, benzethonium and salts thereof, polyvinylpyrrolidone iodine, chlorothymol, nonoxynols, chlorhexidine salts, glutaraldehyde, isothiazolones, cresols, phenols, hexachlorophene and mixtures thereof.

37. The method of claim 36, wherein the biocide is triclosan.

38. The method of claim 17, wherein the preservative is selected from the group consisting of propionates, erythorbates, nitrites, parabens, benzoates, sorbates, sulfites, thiopropionates and mixtures thereof.

39. The method of claim 38, wherein the preservative is thiopropionate.

40. The method of claim 17, wherein the antibiotic is selected from the group consisting of tetracycline, oxytetracycline, chlortetracycline and combinations thereof.

41. The method of claim 19, wherein the antioxidant is in an amount of from about 5 to about 5,000 ppm of the composition.

42. The method of claim 19, wherein the antioxidant is selected from the group consisting of butylated hydroxyanisole, butylated hydroxytoluene, tertiary butyl hydroquinone, ethoxyquin and salts thereof, dilauryl thiodipropionate, n-propyl gallate, tocopherols, tocotrienols, hydroquinone and esters thereof, gallic acid salts and esters thereof, gamma oryzanol, ascorbic acid and ascorbates, ascorbyl palmitate, dipalmitate, and mixtures thereof.

43. The method of claim 42, wherein the antioxidant is ethoxyquin.

44. The method of claim 19, wherein the biocide is in an amount of from about 10 to about 10,000 ppm of the composition.

45. The method of claim 19, wherein the biocide is selected from the group consisting of triclosan, benzalkonium and salts thereof, benzethonium and salts thereof, polyvinylpyrrolidone iodine, chlorothymol, nonoxynols, chlorhexidine salts, glutaraldehyde, isothiazolones, cresols, phenols, hexachlorophene and mixtures thereof.

46. The method of claim 45, wherein the biocide is triclosan.

47. The method of claim 19, wherein the preservative is selected from the group consisting of propionates, erythorbates, nitrites, parabens, benzoates, sorbates, sulfites, thiopropionates and mixtures thereof.

48. The method of claim 47, wherein the preservative is thiopropionate.

49. The method of claim 19, wherein the antibiotic is selected from the group consisting of tetracycline, oxytetracycline, chlortetracycline, and mixtures thereof.

* * * * *